No. 780,428.

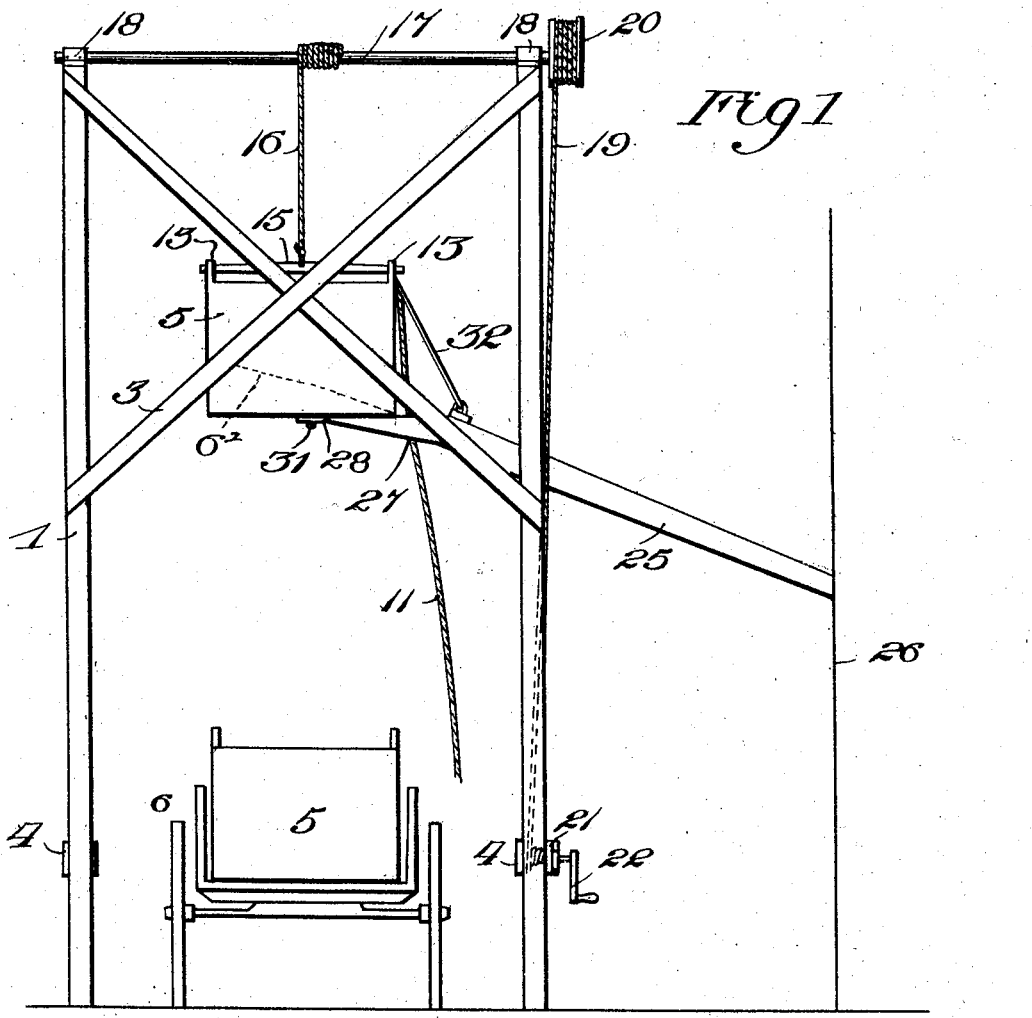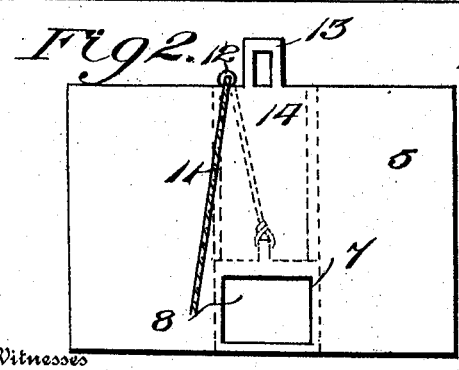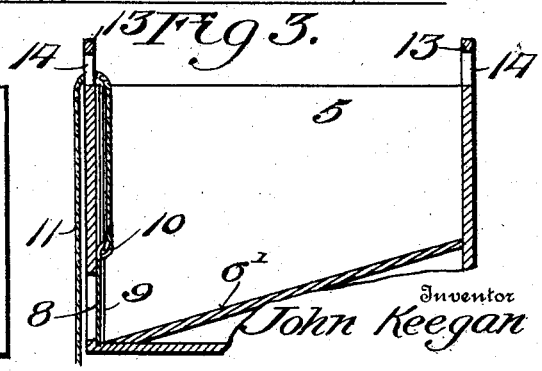

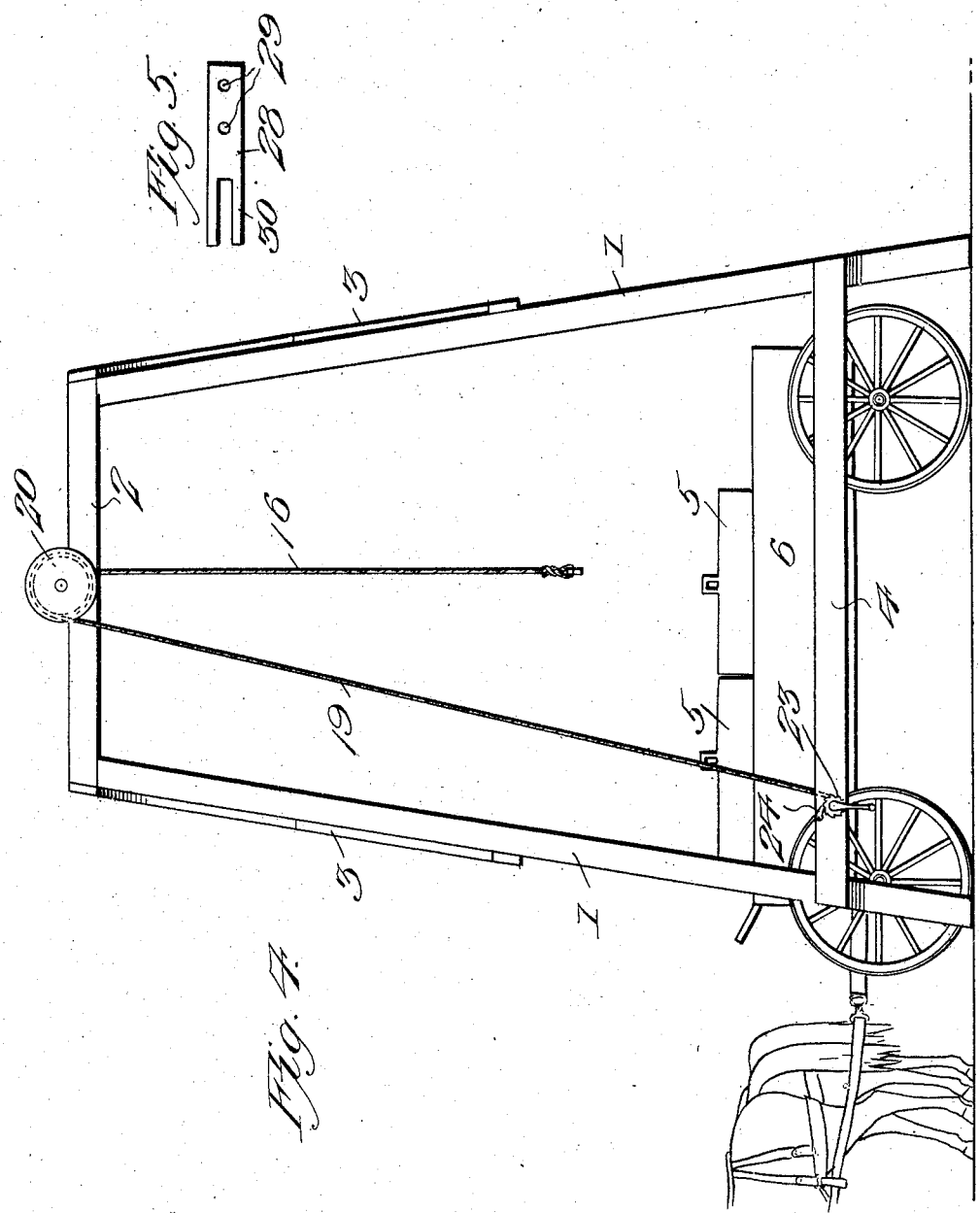

Patented January 17, 1905

UNITED STATES PATENT OFFICE.

JOHN KEEGAN, OF WATERTOWN, SOUTH DAKOTA.

GRAIN-ELEVATOR.

SPECIFICATION forming part of Letters Patent No. 780,428, dated January 17, 1905.

Application filed April 6, 1904. Serial No. 201,936.

*To all whom it may concern:*

Be it known that I, JOHN KEEGAN, a citizen of the United States, residing at Watertown, in the county of Codington and State of South Dakota, have invented new and useful Improvements in Grain-Elevators, of which the following is a specification.

This invention relates to grain-elevating apparatus, the object in view being to provide a portable structure which may be carried from place to place and readily set up, the said structure embodying suitable elevating mechanism especially adapted for the handling of tanks for containing grain or other material, the structure also involving an adjustable chute having special means for connecting the same with the tanks as they are successively raised, the parts of the apparatus being so constructed, combined, and arranged that the delivery of the grain or other material from the tank to the chute is under the control of an operator standing on the ground.

With the above general objects in view and other minor objects, the nature of which will more fully appear as the description proceeds, the invention consists in the novel construction, combination, and arrangement of parts as herein fully described, illustrated, and claimed.

In the accompanying drawings, Figure 1 is an end elevation of a grain-elevating apparatus embodying the present invention, showing an elevated tank and the chute connected therewith, the parts being in position to discharge the contents of the tank in the chute and to conduct the same into a building or warehouse. Fig. 2 is a side elevation of one of the tanks or receptacles. Fig. 3 is a cross-section through the same. Fig. 4 is a side elevation of the apparatus. Fig. 5 is a detail plan view of one of the forks of the chute.

Like reference-numerals designate corresponding parts in all the figures of the drawings.

The grain-elevating apparatus contemplated in this invention comprises, essentially, a portable frame or structure consisting of legs or standards 1, preferably converging toward their upper ends, where they are connected by cross-bars 2 and braces 3, the lower portions of the legs being connected in pairs by cross-bars 4, the arrangement being such that a wagon and team may be driven under and through the structure, as indicated in Figs. 1 and 4.

The grain elevating or hoisting apparatus is designed to be utilized in connection with a series of tanks or receptacles 5, adapted to be placed in the box or body 6 of an ordinary wagon, to which a team may be hitched for moving the wagon beneath and outward from the portable frame or structure. Each tank 5 is provided with an inclined bottom 6', so as to cause the grain or other material to gravitate toward one side of the tank, which side is provided with a discharge-opening 7, normally covered upon the inside by a vertically-sliding gate 8, mounted in suitable guides 9 and having connected to its upper end, as at 10, a gate-operating rope 11, which passes upward through the guide-eye 12 at the top of the tank and downward, so as to be within reach of an operator standing on the ground, who by pulling upon said rope may raise the sliding gate 8 and permit the contents of the tank to be discharged. Each tank 5 is further provided at opposite sides with upwardly-projecting yoke-receiving ears 13, provided with openings 14 for the reception of the opposite ends of a yoke-bar 15, which is connected with the end of a hoisting-rope 16, which extends upward and winds around a rotary overhead shaft 17, supported in bearings 18 on the upper cross-bars 2 of the portable frame. The shaft 17 is operated by means of a winding-rope 19, which passes around a pulley 20 on the shaft 17 and also around the shaft of a windlass 21, provided with an operating crank or handle 22, the windlass 21 being equipped with a ratchet-wheel 23, in connection with which operates a holding pawl or detent 24. Thus by operating the windlass 21 a tank supported by the yoke-bar 15 may be elevated to the desired point at which it may be held by throwing the pawl or detent 24 into engagement with the ratchet-wheel 23.

The apparatus also comprises a chute 25, adapted to lead into a warehouse or building (indicated at 26) and having its receiving end beveled or tapered or offset at an angle, as shown at 27, the said end being provided with one or more forks 28, one of which is shown in detail in Fig. 5, said forks each comprising a body portion, which is provided with openings 29 to receive screws, bolts, or other suitable fasteners by means of which it is connected to the chute, and the slotted or forked end portion 30, which is adapted to engage buttons or studs 31 on the bottom of the tank for properly positioning the tank and chute with respect to each other. The chute is also provided with pivotally-attached suspending-hooks 32, the free bent extremities of which are adapted to be engaged over the upper edge of the tank, as shown in Fig. 1, for the purpose of suspending the upper end of the chute and supporting the same upon the tank.

In operation the wagon is driven under the structure in the manner indicated in Figs. 1 and 4, the yoke-bar 15 is inserted in the ears of one of the tanks, and the windlass is then operated until the tank is partially elevated. The chute is then connected with the tank by means of the forks 28 and suspending-hooks 32, whereupon the combined structures are elevated to the full height required. After the parts have thus been properly elevated the rope 11 is operated for the purpose of opening the sliding gate 8, whereupon the material gravitates along the inclined bottom of the tank into and along the chute 25 and is delivered into the adjacent warehouse or building. The tank and chute are then lowered to substantially the point of the first partial elevation thereof, and the chute then lowered from the tank and the latter lowered into the wagon. The operation just described is repeated until all the tanks have been emptied.

The grain-elevating apparatus hereinabove described is especially adapted for the use of farmers in storing their threshed grain, the apparatus being simple and economical in construction.

At the time the tank is first partially elevated for attachment thereto of the chute the pawl 24 is thrown into engagement with the ratchet 23, so as to hold the tank in position while such attachment is being effected. In like manner when the combined structure is lowered to substantially the point of first elevation of the tank the said tank is similarly operated to enable the chute to be disconnected, all as will be apparent.

Having thus described the invention, what is claimed as new is—

1. Grain-elevating apparatus, comprising a portable frame, hoisting mechanism mounted thereon and comprising a hoisting-rope, a tank detachably coupled to said rope and provided with a discharge-opening in one side, and a chute detachably connected to the tank to be raised and lowered therewith.

2. Grain-elevating apparatus comprising a portable frame, hoisting mechanism mounted thereon and comprising a hoisting-rope, a yoke-bar attached to the end of the hoisting-rope, a tank provided with oppositely-arranged ears to receive the ends of the yoke-bar and also provided with an inclined bottom and a discharge-opening, a sliding gate controlling the discharge-opening, and a gate-operating rope connected with the upper portion of the gate and passing upward through a guide on the tank, substantially as described.

3. Grain-elevating apparatus comprising a portable frame, hoisting mechanism mounted thereon and embodying a hoisting-rope, a tank or receptacle detachably coupled to the hoisting-rope and provided with a discharge-opening in one side, and a chute having means for coupling the same to the tank, said means embodying a fork on the chute and a button or stud on the tank.

4. Grain-elevating apparatus comprising a portable frame, hoisting mechanism thereon embodying a hoisting-rope and a tank detachably connected with said rope and provided with a discharge-opening in one side, and a chute having means for coupling the same to the tank, said coupling means embodying pivotally-attached hooks adapted to engage the tank, a fork connected with the chute, and a button or stud on the tank adapted to be engaged by the fork.

5. Grain-elevating apparatus comprising a portable frame, hoisting mechanism mounted thereon and embodying a hoisting-rope and windlass, a yoke-bar attached to the hoisting-rope, a tank provided with oppositely-arranged ears to receive the ends of the yoke-bar, a button or stud projecting from the bottom of the tank, a chute having the end portion thereof offset to lap under the bottom of the tank, a fork thereon for engaging the button or stud, and a suspending-hook pivotally connected to the chute and adapted to engage over the top of the tank, substantially as described.

JOHN KEEGAN.

In presence of—
F. A. COUNTRYMAN,
E. M. BARKER.